Feb. 12, 1957 W. A. GUEFFROY 2,781,123
APPARATUS FOR TIMING AND FEEDING ARTICLES
Filed Dec. 11, 1952 2 Sheets-Sheet 1
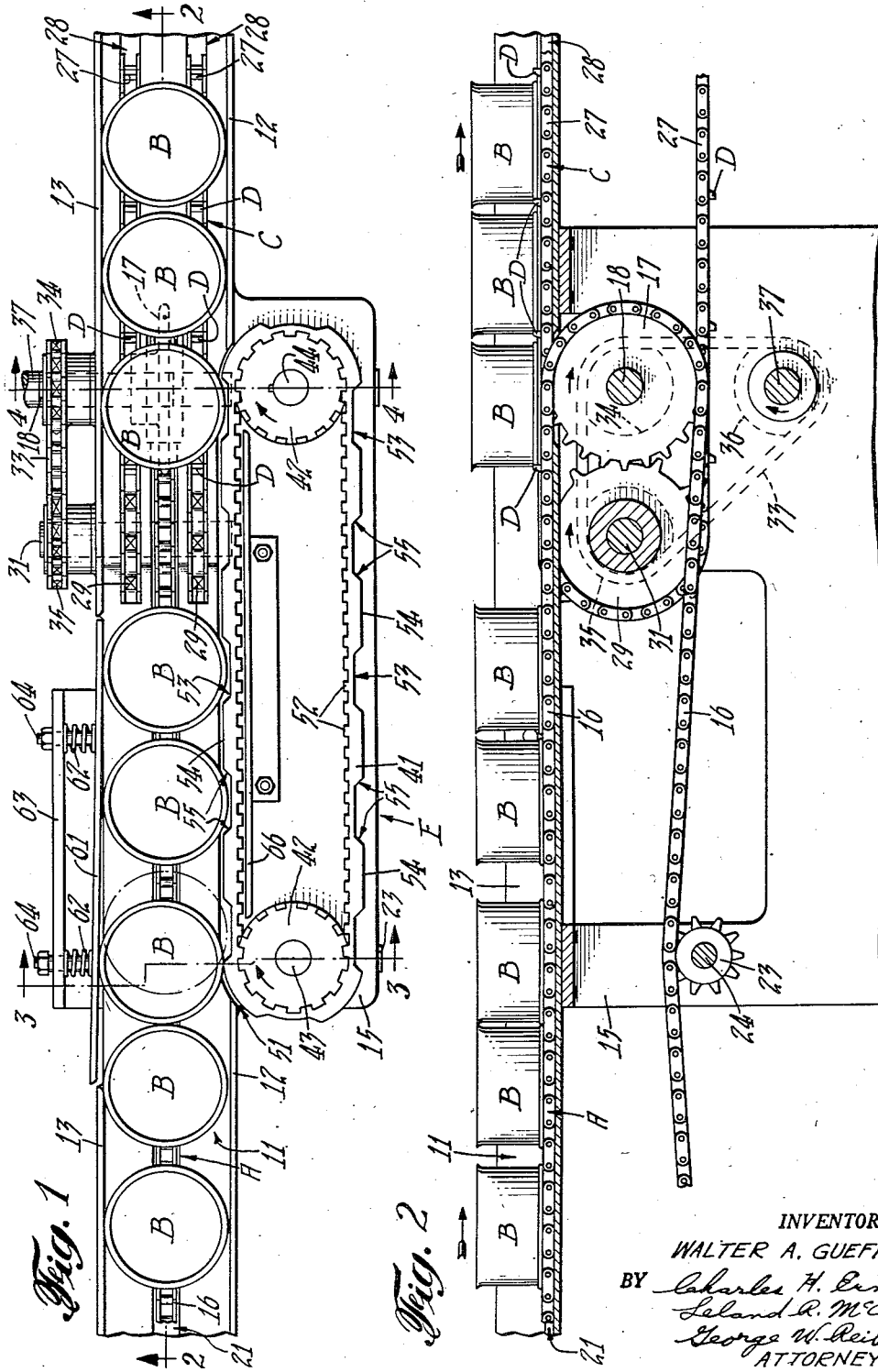
INVENTOR.
WALTER A. GUEFFROY
BY Charles H. Erne
Leland R. McCann
George W. Reiber
ATTORNEYS Feb. 12, 1957 W. A. GUEFFROY 2,781,123
APPARATUS FOR TIMING AND FEEDING ARTICLES
Filed Dec. 11, 1952 2 Sheets-Sheet 2
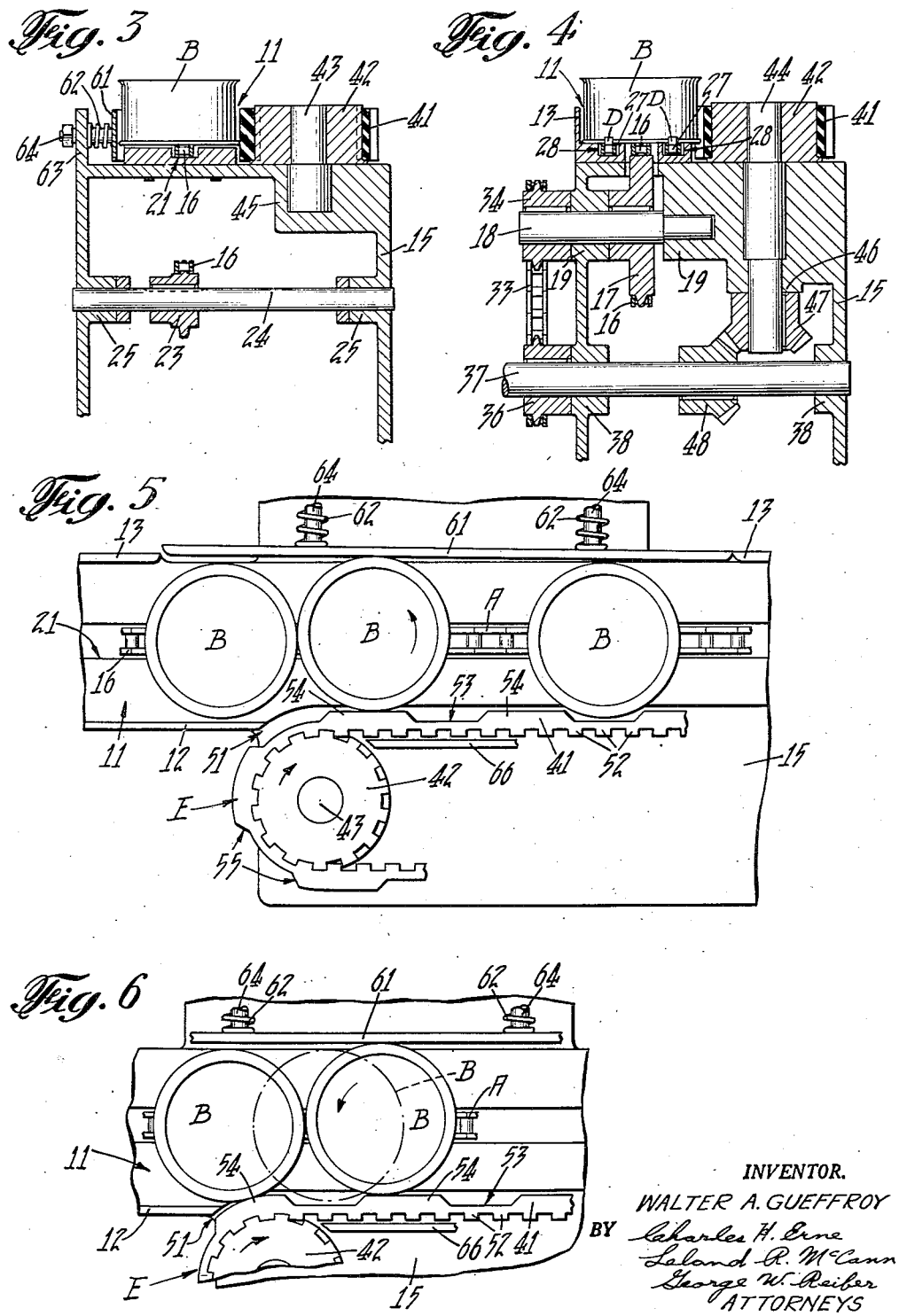
INVENTOR.
WALTER A. GUEFFROY
BY Charles H. Erne
Leland R. McCann
George W. Reiber
ATTORNEYS United States Patent Office 2,781,123
Patented Feb. 12, 1957

2,781,123
APPARATUS FOR TIMING AND FEEDING ARTICLES

Walter A. Gueffroy, Roslyn Heights, N. Y., assignor to American Can Company, New York, N. Y., a corporation of New Jersey Application December 11, 1952, Serial No. 325,472

2 Claims. (Cl. 198—34)

The present invention relates to an apparatus for feeding articles such as cans or containers moving along a straight line path of travel in processional order into a timed feeding conveyor of a subsequent operation machine and has particular reference to a timing and indexing device for repositioning, through a retarding action, random spaced untimed articles in the procession to coordinate them with the timed feeding conveyor for proper delivery thereto. This is a companion application to my copending United States application Serial No. 325,471, filed December 11, 1952, on Apparatus for Timing and Feeding Articles, and United States application Serial No. 325,473, filed December 11, 1952, and now Patent No. 2,679,313, on Apparatus for Timing and Feeding Articles.

The invention contemplates the provision of a can or container timing and indexing device for use with a conveyor, preferably a straight line conveyor adapted to receive the cans or containers in random spaced and untimed relation from a source of supply such as a filling table where the cans are filled manually, and to deliver them in timed and processional order to an automatic machine such as a can or container closing machine.

An object of the invention is the provision in a straight line conveyor apparatus of a timing and indexing device wherein random spaced untimed articles moving in processional order may be readily repositioned or relocated in timed and properly spaced order for proper reception by a timed feeding mechanism of a subsequent operation machine without arresting the forward travel of the articles.

Another object is to provide such a device which will space and feed mispositioned or dislocated filled cans with a minimum of jarring or disturbance to the contents of the cans, so that the device may be used to advance open top liquid filled cans.

Another object is to provide such a device which will keep the mispositioned or dislocated cans in continuous motion with merely a gentle retarding action thereof during the repositioning operation to effect a controlled release at the proper time of the cans to be received by the subsequent operation machine.

Numerous other objects and advantages of the invention will be apparent as it is better understood from the following description, which, taken in connection with the accompanying drawings, discloses a preferred embodiment thereof.

Referring to the drawings:

Figure 1 is a plan view of a conveyor mechanism embodying the timing and indexing device of the present invention, with parts broken away;

Fig. 2 is a sectional view taken substantially along the line 2—2 in Fig. 1, parts being broken away;

Fig. 3 is a sectional view taken substantially along the broken line 3—3 in Fig. 1, parts being broken away;

Fig. 4 is a sectional view taken substantially along the line 4—4 in Fig. 1, parts being broken away; and Figs. 5 and 6 are enlarged fragmentary plan views of the portion of the apparatus shown at the left in Fig. 1, and illustrating how out-of-time cans are repositioned in properly timed relation.

As a preferred or exemplary embodiment of the instant invention the drawings illustrate principal parts of a conventional straight line transfer conveyor A (Fig. 1) carrying random spaced, open top, liquid filled cylindrical cans B in processional order toward a connecting timed feeding conveyor C having spaced feed dogs D which conveyor may be a part of a subsequent operation machine. A timing and indexing device E embodying the present invention is disposed adjacent the transfer conveyor A for respacing or relocating and timing the cans B on the conveyor A for proper delivery into the feeding conveyor C in time with the advancement of its feed dogs D in a manner which prevents spilling of the liquid contents of the cans. Although the drawings show the subsequent operation machine feeding conveyor C having spaced feed dogs D for receiving and propelling the timed cans B directly into the machine, the invention is equally well adapted to timing the cans B for entrance into a conventional feed worm, star wheel or other suitable feeding element.

The open, filled cans B, in an upright position, are advanced continuously through the conveyor A in a horizontally disposed straight line open runway 11 having opposed longitudinal, spaced and parallel guide rails 12, 13 for guiding the cans in processional order. The runway 11 is supported on a frame 15 which constitutes the main frame of the apparatus.

The transfer conveyor A, which receives the cans B from any suitable source of supply such as a previous operation machine or filling table which discharges them in random spacings, preferably comprises a single endless chain 16 which extends from the previous operation machine or table and which operates over a sprocket 17 mounted on a horizontally disposed transverse shaft 18 (Figs. 2 and 4) journaled in a pair of spaced bearings 19 formed in the frame 15. The shaft 18 is rotated continuously in time with the feeding conveyor C and the timing and indexing device E in a manner which will be hereinafter explained.

The upper run of the transfer chain 16 operates in a longitudinal groove 21 (see also Fig. 3) formed in the floor of the runway 11, the groove 21 having a uniform depth slightly less than the depth of the chain so that the chain projects slightly above the floor of the runway to support the cans clear of the floor. The lower run of the chain 16 operates over an idler sprocket 23 (Figs. 2 and 3) mounted on a transverse shaft 24 carried in spaced bearings 25 formed in the frame 15. The transfer chain 16 has no feed dogs or other means for propelling the random spaced cans B carried thereon and depends solely upon the frictional engagement between the bottoms of the cans and the chain to advance the cans along the runway 11.

The feeding conveyor C having the spaced feeding dogs D, which receives the cans B from the transfer conveyor A, preferably comprises a pair of transversely spaced and parallel endless chains 27 (Figs. 1, 2 and 4) disposed in a horizontal position, one on each side of the discharge end of the transfer conveyor A. The upper runs of the chains 27 operate in a pair of spaced and parallel grooves 28 formed in the floor of the runway 11, the grooves 28 having a uniform depth slightly less than the depth of the chains so that the chains project slightly above the floor of the runway to support the cans B clear of the floor.

Adjacent the discharge end of the transfer conveyor A, the chains 27 of the feeding conveyor C overlap the transfer conveyor and operate over a pair of spaced and parallel sprockets 29 (Figs. 1, 2 and 4) mounted on a transverse horizontal shaft 31 journaled in a pair of spaced bearings, similar to the bearings 19, in the frame 15. This feeding conveyor shaft 31 and the transfer conveyor shaft 18 are rotated in synchronism and at substantially the same linear speed, by an endless driving chain 33. The driving chain 33 operates over three sprockets, a sprocket 34 on the shaft 18, a sprocket 35 on the shaft 31, and a driving sprocket 36 on a main driving shaft 37 journaled in bearings 38 formed in the frame 15. The driving shaft 37 may be rotated in any suitable manner preferably by connection with the subsequent operation machine.

The timing and indexing device E is disposed adjacent the transfer conveyor A preferably near the discharge end of the conveyor and includes a horizontally disposed endless belt 41 which operates over a pair of spaced toothed pulleys 42 mounted on a pair of spaced and parallel vertical shafts 43, 44 disposed adjacent the runway 11 and journaled in bearings 45, 46 (Figs. 3 and 4) in the frame 15. The shaft 44 is the driving shaft and extends below its bearing 46, as best shown in Fig. 4, and carries a bevel gear 47 which meshes with and is driven by a bevel gear 48 keyed to and rotating with the main driving shaft 37. In this manner the timing belt 41 is operated continuously in synchronism with and at substantially the same linear speed as the transfer conveyor A. The inner run of the timing belt 41 extends along one side of the runway 11 and projects into the runway where it travels in the path of the cans B advancing along the runway. For this purpose the side guide 12 of the runway is cut away to form an opening 51 (Fig. 1) to admit the belt.

The timing belt 41 preferably is made of a resilient material, such as rubber, and its inner face is formed with transverse teeth 52 for meshing engagement with the teeth on the pulleys 42 to drive the belt without slippage on the pulleys and to keep the belt in timed relation with the transfer conveyor A. The outer face of the belt is formed with a plurality of spaced transverse clearance recesses 53 which set off between them flat lands or projections 54. The transverse edges of the lands 54 preferably are formed with beveled portions 55 which extend into the recesses 53.

The recesses 53 in the timing belt 41 are spaced apart a distance substantially equal to the longitudinal distance between the feed dogs D on the feeding conveyor C, and are located in the belt in timed relation to the feed dogs D on the feeding conveyor. The recesses 53 also are of a width to just clear a can in the runway 11, without engaging it as shown in the dot and dash position of the can in Figs. 1 and 6, so that any can which is being advanced through the runway 11 by the transfer conveyor A and which is by chance in properly timed relation to the feed dogs D on the feeding conveyor C, will enter one of the recesses 53 on the timing belt 41 as shown in Fig. 5 and will continue to advance with the transfer conveyor A without interference while remaining in its recess 53 in the moving timing belt 41, and so will be carried forward onto the feeding conveyor C in proper time in front of a pair of the feed dogs D for further advancement into the subsequent operation machine without having its forward movement arrested at any time.

When a can B is not in this properly timed position on the transfer conveyor A, such as when the cans are in contiguous relation or are irregularly spaced and out of time, the can does not enter one of the recesses 53 on the timing belt 41, but instead is engaged by one of the lands 54 as shown in Fig. 6 and is compressed or wedged between the land and the side of the runway 11. In order to prevent crushing the can, a portion of the runway side guide 13 for a short distance along the runway is cut away and a yieldable guide plate 61 substituted. This guide plate 61 normally forms a continuation of the runway side guide 13 and is backed up by a pair of compression springs 62 interposed between the guide plate and a stationary bracket 63 formed on the frame 15. Studs 64 attached to the guide plate 61 extend through the springs 62 and the bracket 63 and thus retain the plate yieldably in place.

When an untimed can B is engaged by a land 54 of the timing belt 41, the moving belt rolls the can forward between the land and the yieldable guide plate 61 in the direction of the arrow shown in Fig. 5 at a speed slower than the speed of the transfer conveyor A, thus causing the conveyor to slip under the can. This rolling action retards the forward advancement of the can. As the moving belt 41 continues to roll or rotate the can, the can travels along the land and falls into the adjacent following recess 53. This action repositions the can on the transfer conveyor A and locates it in timed relation with the feeding conveyor C.

As soon as the can falls into the following recess 53 it is free of the yieldable guide plate 61 and the timing belt 41 and thus the can stops rolling and is returned to the control of the transfer conveyor A which continues the advancement of the repositioned and timed can toward the conveyor C for transfer thereto in time with the advancement of its feed dogs D. A stationary backing-up plate 66 disposed adjacent the inner face of the inner run of the timing belt 41 retains the belt against outward displacement when a can rolls along a land 54 of the belt. The plate 66 is secured to the frame 15.

In this manner any untimed can B on the transfer conveyor A is retarded in its advancement and is repositioned on the transfer conveyor in a proper timed and indexed position so that it will be transferred by the transfer conveyor A to the feeding conveyor C in proper position and time in front of the feed dogs D for advancement into the subsequent operation machine without arresting the advancement of the can. Under this continuous advancement of the can, even though it is at times retarded, no spilling of the contents takes place.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. In an apparatus for retiming randomly spaced cylindrical containers advancing in indiscriminate processional order, the combination of a transfer conveyor for frictionally engaging the bases of said containers to carry them along a predetermined straight line path of travel, a yieldable guide extending along one side of said transfer conveyor, an endless resilient timing belt of rubber-like material having a run extending along the opposite side of said transfer conveyor and movable in the same direction and at the same speed as said transfer conveyor, said belt operating around a pair of sprockets spaced longitudinally along said transfer conveyor and being provided on its inner side with a plurality of integrally formed teeth which are maintained in tight engagement with said sprockets by the inherent resiliency of said belt, a plurality of integral resilient timing projections formed on the outer side of said belt and extending into the path of travel of said containers, a series of timing recesses disposed between said timing projections for receiving correctly timed containers, said resilient timing projections and said yieldable guide cooperating to yieldably engage diametrically opposed portions of each untimed container to frictionally rotate the same reversely along its engaged timing projection and thence into its immediately succeeding timing belt recess to place said container into correctly timed position, and means for backing up the can engaging run of said resilient belt to prevent stretching of the belt to thereby maintain said projections in contact with said containers while they are being retimed.

2. Apparatus as defined in claim 1 wherein said containers are provided with laterally projecting cylindrical bottom end seams and said yieldable guide and said endless timing belt extend below the upper surface of said transfer conveyor for engagement with said container seams for the purpose described.

References Cited in the file of this patent

UNITED STATES PATENTS

| | | |
|---|---|---|
| 1,828,324 | Kruse | Oct. 20, 1931 |
| 2,397,312 | Forrest | Mar. 26, 1946 |
| 2,471,098 | Davies | May 24, 1949 |

FOREIGN PATENTS

| | | |
|---|---|---|
| 599,936 | Great Britain | Mar. 24, 1948 |